United States Patent
Bodog et al.

(10) Patent No.: US 9,729,418 B2
(45) Date of Patent: Aug. 8, 2017

(54) METHOD FOR HETEROGENEOUS NETWORK POLICY BASED MANAGEMENT

(71) Applicant: Nokia Siemens Networks OY, Espoo (FI)

(72) Inventors: Gyula Bodog, Budapest (HU); Anatoly Andrianov, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 564 days.

(21) Appl. No.: 13/871,428

(22) Filed: Apr. 26, 2013

(65) Prior Publication Data

US 2013/0290230 A1    Oct. 31, 2013

Related U.S. Application Data (60) Provisional application No. 61/639,131, filed on Apr. 27, 2012.

(51) Int. Cl.
| | | |
|---|---|---|
| G06F 15/18 | (2006.01) | |
| H04L 12/26 | (2006.01) | |
| H04L 12/24 | (2006.01) | |
| H04W 24/10 | (2009.01) | |

(52) U.S. Cl.
CPC ...... *H04L 43/0876* (2013.01); *H04L 41/0604* (2013.01); *H04L 41/0681* (2013.01); *H04L 41/0893* (2013.01); *H04L 43/16* (2013.01); *H04W 24/10* (2013.01); *H04L 43/08* (2013.01)

(58) Field of Classification Search
USPC .......................................................... 706/14
See application file for complete search history.

(56) References Cited

U.S. PATENT DOCUMENTS

| | | | | |
|---|---|---|---|---|
| 8,892,113 | B2 * | 11/2014 | Ratasuk | H04W 72/0486 |
| | | | | 455/452.2 |
| 9,078,144 | B2 * | 7/2015 | Harris | H04W 24/02 |
| 9,143,963 | B2 * | 9/2015 | Bodog | H04W 24/08 |

(Continued)

FOREIGN PATENT DOCUMENTS

| | | |
|---|---|---|
| EP | 2 360 962 A2 | 8/2011 |
| WO | 2010/015411 A1 | 2/2010 |

(Continued)

OTHER PUBLICATIONS

A portable system for robust acoustic detection of atypical situations Stavros Ntalampiras; Ilyas Potamitis; Nikos Fakotakis 2009 17th European Signal Processing Conference Year: 2009 pp. 1121-1125 IEEE Conference Publications.*

(Continued)

*Primary Examiner* — Michael B Holmes
(74) *Attorney, Agent, or Firm* — Squire Patton Boggs (US) LLP (57) ABSTRACT

Communication networks in general may benefit from appropriate policy based management. More particularly, heterogeneous networks or HetNets may benefit from methods for policy based management. A method according to certain embodiments includes detecting a reportable event. The method also includes determining whether or how to report the event based on a probability criterion. The method further includes taking an action with respect to reporting the event based on whether the probability criterion is met.

26 Claims, 6 Drawing Sheets

(56) References Cited

U.S. PATENT DOCUMENTS

| | | | | |
|---|---|---|---|---|
| 9,307,556 B2* | 4/2016 | Ratasuk | ................ | H04W 74/04 |
| 9,326,167 B2* | 4/2016 | Andrianov | ............ | H04W 24/08 |
| 9,526,110 B2* | 12/2016 | Andrianov | ........ | H04W 72/1215 |
| 9,538,402 B2* | 1/2017 | Harris | ................... | H04W 24/04 |
| 2002/0059078 A1* | 5/2002 | Valdes | ............... | H04L 41/0631 |
| | | | | 705/1.1 |
| 2009/0163199 A1 | 6/2009 | Kazmi et al. | | |

FOREIGN PATENT DOCUMENTS

| | | |
|---|---|---|
| WO | 2010/068879 A1 | 6/2010 |
| WO | WO 2010068879 A1 * | 6/2010 |

OTHER PUBLICATIONS

Coverage-based Clustering of Wireless Sensor and Actor Networks Brian McLaughlan; Kemal Akkaya IEEE International Conference on Pervasive Services Year: 2007 pp. 45-54, DOI: 10.1109/PERSER.2007.4283888 IEEE Conference Publications.*

An early warning and security countermeasure (EWSC) system for electric power control centers B. M. Zhang; S. N. Wu; B. Cai; W. C. Wu; H. B. Sun; Q. Guo 2005 International Power Engineering Conference Year: 2005 pp. 728-733 vol. 2, DOI: 10.1109/IPEC.2005.207003 IEEE Conference Publications.*

Reliability of inspection for fatigue cracks in offshore structures J. R. Rudlin IEE Colloquium on Inspection Reliability: State-of-the-Art (Digest No. 1996/178) Year: 1996 pp. 6/1-6/3, DOI: 10.1049/ic:19961032 IET Conference Publications.*

3GPP TR 32.827 V10.1.0 (Jun. 2010); 3rd Generation Partnership Project; Technical Specification Group Services and System Aspects; Telecommunication management; Integration of device management information with Itf-N (Release 10).

3GPP TSG SA WG5 (Telecom Management) Meeting #83; S5-121366; Nokia Siemens Networks; "Flexible policies for management of Heterogeneous Networks"; May 7-11, 2012; Sarajevo, Bosnia and Herzegovina.

3GPP TR 32.835 V0.0.4 (Apr. 2012); 3rd Generation Partnership Project; Technical Specification Group Services and System Aspects; Telecommunication management; Study of Heterogeneous Networks Management (Release 11).

International Search Report international application No. PCT/EP2013/058707 dated Aug. 21, 2013.

3GPP TR 32.835 V0.0.3 (Feb. 2012) "3rd Generation Partnership Project; Technical Specification Group Services and System Aspects; Telecommunication management; Study of Heterogeneous Networks Management (Release 11)"; 3GPP; 650, Route des Lucioles—Sophia Antipolis—Valbonne—France; pp. 1-8.

European Examination Report issued in corresponding European Application No. 13 719 525.1 dated Apr. 6, 2017.

* cited by examiner

METHOD FOR HETEROGENEOUS NETWORK POLICY BASED MANAGEMENT

CROSS-REFERENCE TO RELATED APPLICATION

This application is related to and claims the priority of U.S. Provisional Patent Application 61/639,131, filed Apr. 27, 2012, which is hereby incorporated herein by reference in its entirety.

BACKGROUND

Field

Communication networks in general may benefit from appropriate policy based management. More particularly, heterogeneous networks or heterogeneous networks (HetNets) may benefit from methods for policy based management.

Description of the Related Art

Heterogeneous network management is generally discussed in the third generation partnership project (3GPP) technical report (TR) 32.835, ver. 0.0.3 of which is hereby incorporated herein by reference in its entirety. Generally, HetNets are large networks, which may include about ten times more network elements (NEs) within the network than traditional networks. Moreover, HetNets may have strict restrictions on operating expenses (OPEX).

One approach to HetNet management is policy based management, in which individual network elements may be grouped by their "importance" and groups may be assigned "active" or "passive" roles, either actively generating management data or passively waiting to be polled by the manager. This approach can involve the operator manually tagging the network elements as being associated with a particular importance group.

The static, manual allocation of network elements to the groups with similar importance characteristics to be managed by corresponding "active"/"passive" policies does not take into account variations in the level of traffic load, for example, a cell may be located in a shopping mall, which is heavily loaded during day time and idle during night time, or a cell may be located in a business center heavily loaded on weekdays and idle on weekends, and so forth.

The binary, active/passive, management policies do not allow flexibility of control over the amount of generated management data and resulting OPEX in consideration of changing environment.

SUMMARY

According to certain embodiments, a method can include detecting a reportable event. The method can also include determining whether or how to report the event based on a probability criterion. The method can further include taking an action with respect to reporting the event based on whether the probability criterion is met.

In certain embodiments, a method can include defining a management goal of a communication network in terms of a policy with respect to a key performance indicator and a threshold. The method can also include collecting an event report. The method can further include computing the key performance indicator. The method additionally can include determining whether at least one of a management policy allocation or a management policy performance satisfies the management goal, based on the key performance indicator and the threshold.

An apparatus, according to certain embodiments, can include at least one processor and at least one memory including computer program code. The at least one memory and the computer program code can be configured to, with the at least one processor, cause the apparatus at least to detect a reportable event. The at least one memory and the computer program code can also be configured to, with the at least one processor, cause the apparatus at least to determine whether or how to report the event based on a probability criterion. The at least one memory and the computer program code can further be configured to, with the at least one processor, cause the apparatus at least to take an action with respect to reporting the event based on whether the probability criterion is met.

An apparatus, in certain embodiments, can include at least one processor and at least one memory including computer program code. The at least one memory and the computer program code can be configured to, with the at least one processor, cause the apparatus at least to define a management goal of a communication network in terms of a policy with respect to a key performance indicator and a threshold. The at least one memory and the computer program code can also be configured to, with the at least one processor, cause the apparatus at least to collect an event report and compute the key performance indicator. The at least one memory and the computer program code can further be configured to, with the at least one processor, cause the apparatus at least to determine whether at least one of a management policy allocation or a management policy performance satisfies the management goal, based on the key performance indicator and the threshold.

According to certain embodiments, an apparatus can include detecting means for detecting a reportable event. The apparatus can also include determining means for determining whether or how to report the event based on a probability criterion. The apparatus can further include reporting means for taking an action with respect to reporting the event based on whether the probability criterion is met.

In certain embodiments, an apparatus can include defining means for defining a management goal of a communication network in terms of a policy with respect to a key performance indicator and a threshold. The apparatus can also include collecting means for collecting an event report. The apparatus can further include computing for computing the key performance indicator. The apparatus can additionally include determining means for determining whether at least one of a management policy allocation or a management policy performance satisfies the management goal, based on the key performance indicator and the threshold.

A non-transitory computer readable medium can, in certain embodiments, be encoded with instructions that, when executed in hardware, perform a process. The process can include detecting a reportable event. The process can also include determining whether or how to report the event based on a probability criterion. The process can further include taking an action with respect to reporting the event based on whether the probability criterion is met.

A non-transitory computer readable medium can, according to certain embodiments, be encoded with instructions that, when executed in hardware, perform a process. The process can include defining a management goal of a communication network in terms of a policy with respect to a key performance indicator and a threshold. The process can also include collecting an event report. The process can further include computing the key performance indicator. The process additionally can include determining whether at least one of a management policy allocation or a management policy performance satisfies the management goal, based on the key performance indicator and the threshold.

BRIEF DESCRIPTION OF THE DRAWINGS

For proper understanding of the invention, reference should be made to the accompanying drawings, wherein.

DETAILED DESCRIPTION

Certain embodiments permit operators to able to manage larger networks with the same number of personnel and without significant increase of the amount of management data. Moreover, certain embodiments avoid static, manual allocation of network elements to groups by using self-grouping and self-allocation of a management policy. Furthermore, certain embodiments permit flexibility of control over the amount of generated management data and resulting OPEX in consideration of changing environments using probabilistic management policies. More particularly, certain embodiments permit controlling network elements where instead of staying completely "silent," namely in a purely passive mode, or completely active, the network element is allowed to report certain management data based on assigned probability of reporting defined in a policy. The reported management data can include fault management (FM) data such as alarms, performance management (PM) data, such as measurements, and configuration management (CM) data.

Thus, according a first aspect, certain embodiments provide for network element self-grouping and/or self-allocation to a particular management policy.

For example, an operator may specify a set of key performance indicators (KPIs) and may set their thresholds as criteria for allocating a network element to a particular management group, managed by a common policy. The mechanism for such an implementation may be a rule set or a grouping policy. The network elements will be allocated to specific groups not only by the "importance" parameter manually configured by the operator, but by evaluating key performance indicators that may be important operationally, such as amount of carried traffic, number of served user equipment (UEs), number of incoming and outgoing handovers, presence of very important person (VIP) users, call failure rates, state of energy savings (ES) algorithm on the network element and neighboring network elements, and the like. The key performance indicators or operational indicators will be re-evaluated periodically and network elements may change their management group assignments accordingly.

Self-grouping of network elements can be implemented in at least two ways. Certain key performance indicators and/or measurements can be reported by the network element to the management system. The management system can have its own algorithm running to decide the importance of the network element based on the reported key performance indicator(s) or measurement(s). As an outcome of the algorithm, the management system can configure the assigned priority to the network element.

Alternatively, the measurements/key performance indicators can be evaluated by the network element itself and the network element itself can assign to itself an appropriate priority and can act accordingly to the assigned priority.

Moreover, according to a second aspect, certain embodiments provide for probabilistic and/or flexible management policies. Management policies can be relaxed from strictly active/passive to flexible/probability based. For example, a group of network elements may be given certain probability p of performance management reporting as a configuration parameter. At the end of a performance management reporting interval, each network element within the group can generate a random number and compare it with configured probability p. When the random number exceeds the probability threshold p, the network element will actively report the collected measurements. When the random number is below the threshold p, the network element will not report the collected measurements but will rather store them for a predefined amount of time for potential retrieval by the manager. This can permit significant reduction, controlled by the value of p, of the amount of management data generated by the group of network elements. The probabilistic approach can ensure that the management data will be reported even if a manually selected reporter network element fails. The probability of reporting may be configured at a high level, controlling reporting of all performance management measurements, or the probability of reporting may be configured on a per measurement or per measurement group level, allowing finer control.

Figure 1:
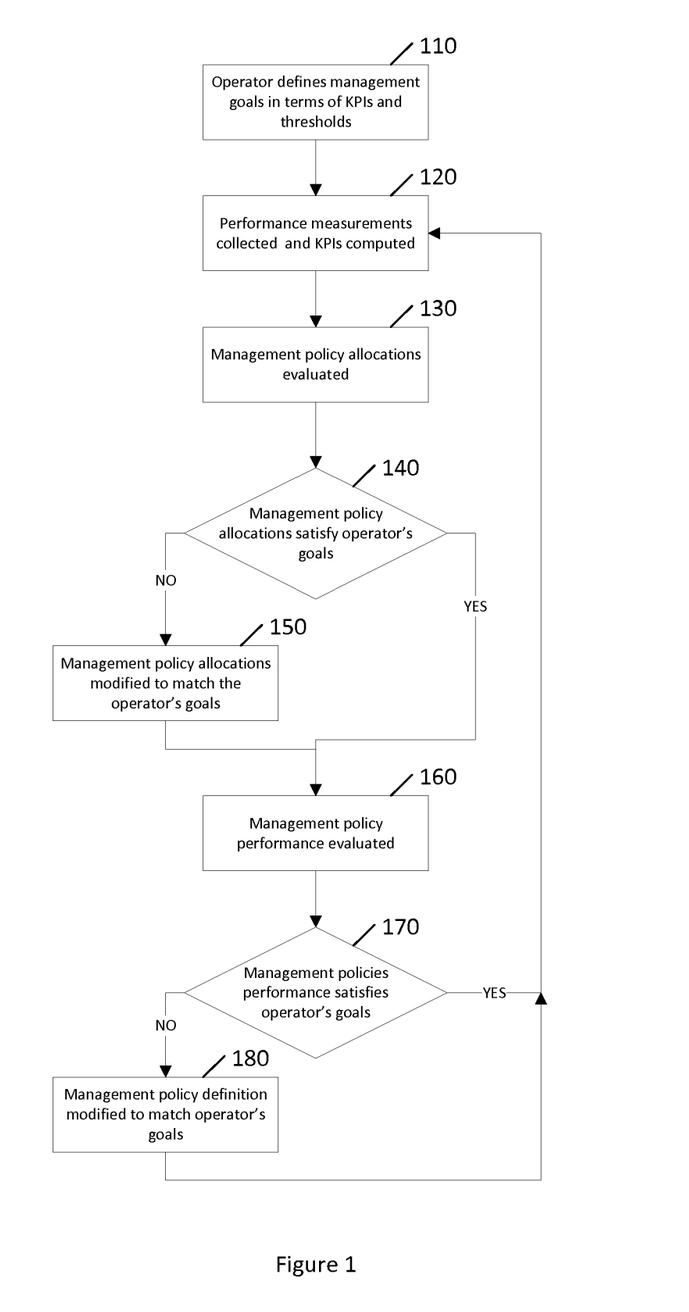
FIG. 1 illustrates a method of management according to certain embodiments.

FIG. 1 illustrates a method of management according to certain embodiments. As shown in FIG. 1, at 110, the operator can define management goals in terms of key performance indicators (KPIs) and thresholds. Next, at 120, the performance measurements can be collected and the key performance indicators computed.

Then, at 130, management policy allocations can be evaluated. A determination can be made, at 140, whether management policy allocations satisfy operator's goals. If not, at 150, management policy allocations can be modified to match the operator's goals. Then, or directly if the management policy allocations do satisfy operator's goals, at 160 management policy performance can be evaluated. Based on that evaluation, it can be determined, at 170, whether management policies' performance satisfies the operator's goals. If not, at 180, the management policy definition can be modified to match the operator's goals. Otherwise, or after such modification, the method can revert to the measurement of performance and computation of key performance indicators, at 120.

Figure 2:
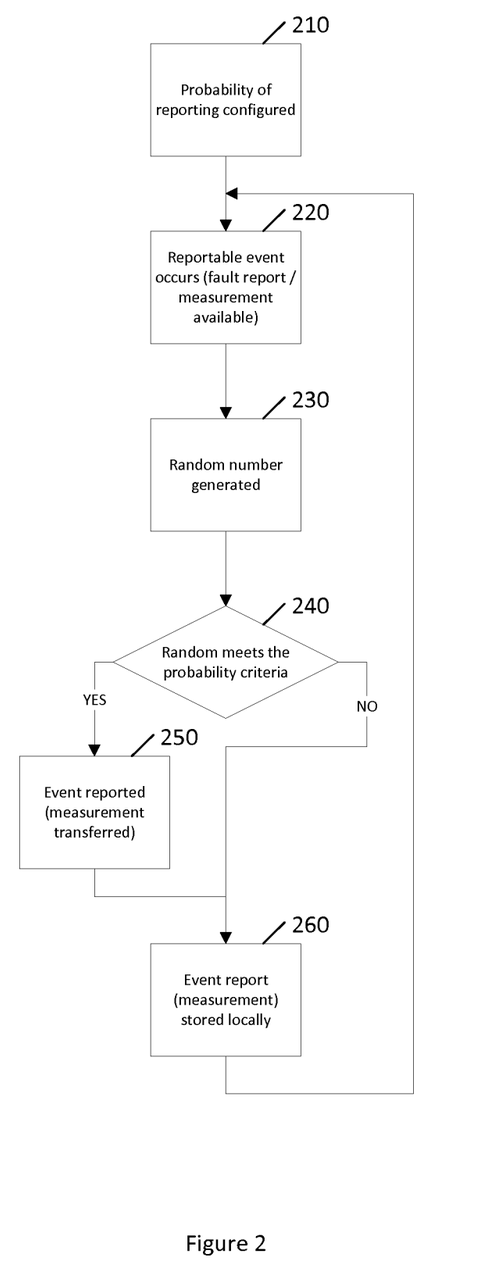
FIG. 2 illustrates a method of event reporting according to certain embodiments.

FIG. 2 illustrates a method of event reporting according to certain embodiments. As shown in FIG. 2, the method can include, at 210, configuring a probability of reporting. At 220, a reportable event can occur. Reportable events can include, for example, a fault report or a measurement becoming available. Random number generation can occur at 230. Then, at 240, a determination can be made with respect to a probability criterion. For example, the probability criteria can be a threshold, and if the random number is above the threshold, it can be determined that the probability criteria has been met. Thus, in one example, a threshold of 0.5 can set, and a random number on the range of 0 to 1 can be generated. If the random number happens to be greater than 0.5, then the device can be determine that the probability criteria has been met. This can reduce the reporting to 50%, on average. Other thresholds can be used in connection with this example, such as 0.1 for a 90% reporting rate and 0.9 for a 10% reporting rate.

If the threshold is met, then at 250 the event can be reported and/or the measurement can be transferred. Otherwise, or in general even if the event is reported or the measurement is transferred, the event report or measurement can be stored locally at 260. This storage can take place prior to or in parallel with other aspects of the method. For example, the storage can take place before the generation of the random number. The process can be cyclical.

Figure 3:
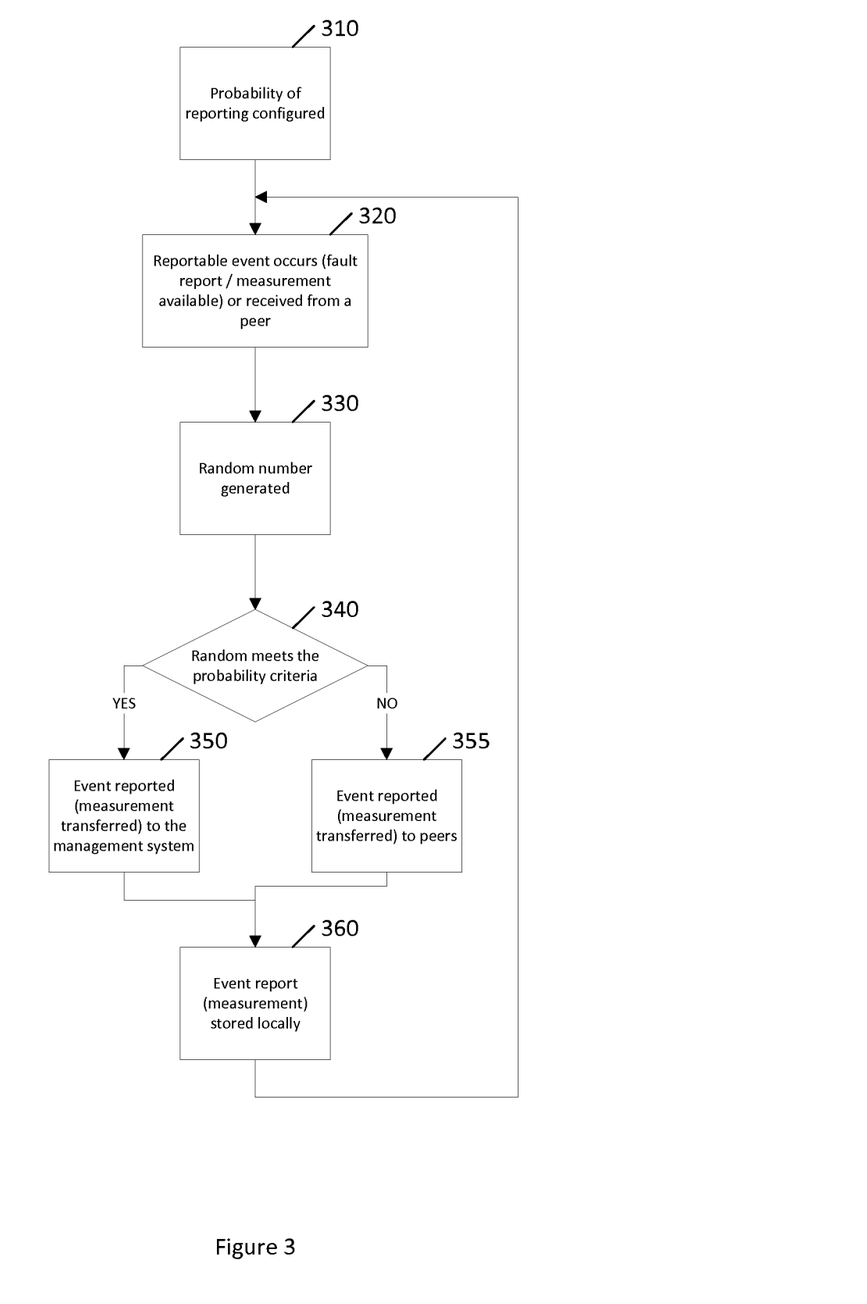
FIG. 3 illustrates a method of event reporting according to certain embodiments.

FIG. 3 illustrates a method of event reporting according to certain embodiments. As shown in FIG. 3, the method can include, at 310, configuring a probability of reporting. At 320, a reportable event can occur. Reportable events can include, for example, a fault report or a measurement becoming available. The reportable event or measurement can also be received from a peer, rather than occurring or being generated locally.

Random number generation can occur at 330. Then, at 340, a determination can be made with respect to a probability criterion. For example, the probability criteria can be a threshold, and if the random number is above the threshold, it can be determined that the probability criteria has been met, as described above in reference to FIG. 2.

If the threshold is met, then at 350 the event can be reported and/or the measurement can be transferred to a management system. Otherwise, at 355, the event can be reported and/or the measurement can be transferred to one or more peer(s).

The event report or measurement can be stored locally at 360. This storage can take place prior to or in parallel with other aspects of the method. For example, the storage can take place before the generation of the random number. The process can be cyclical.

Figure 4:
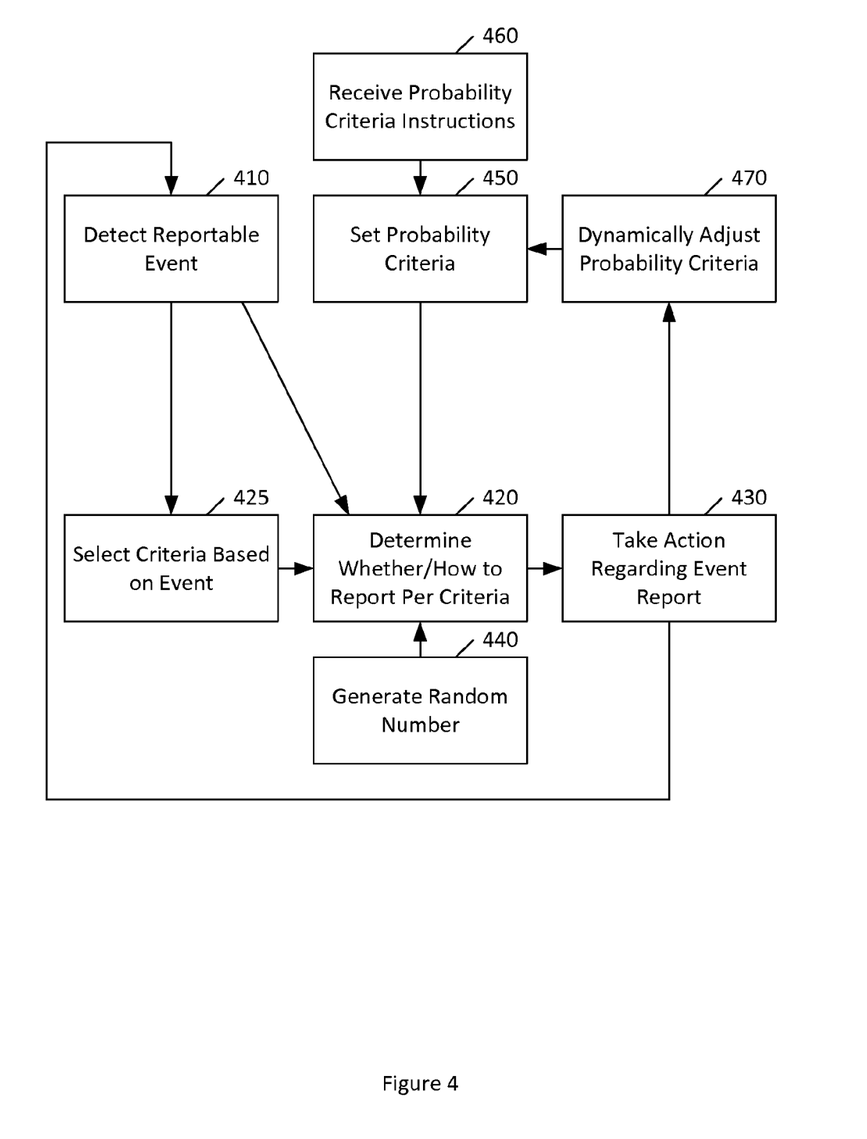
FIG. 4 illustrates a method of a network element according to certain embodiments.

FIG. 4 illustrates a method of a network element according to certain embodiments. As shown in FIG. 4, the method can include, at 410, detecting a reportable event. The detecting the reportable event can include detecting a fault report, detecting that a measurement is available, or detecting that a fault report or measurement has been received from a peer device.

The method can also include, at 420, determining whether or how to report the event based on a probability criterion. The probability criterion can be selected, at 425, from a plurality of probability criteria. The probability criterion selected can depend on the type of the reportable event. For example, a fault report can have a lower threshold than a measurement report, or vice versa. Moreover, a fault report of a particular type can have a higher threshold than a fault report of a different type.

The method can further include, at 430, taking an action with respect to reporting the event based on whether the probability criterion is met. The taking the action can comprise at least one of sending an event report to a management system, sending the event report to a peer, or storing the event report. For example, it can include both sending the event report to a peer and storing the event report.

The method can additionally include, at 440, generating a random number. The determining described above can include comparing the random number to a predetermined threshold. The method can also include, at 450, setting the probability criterion. The setting the probability criterion can be based on instructions received from a management system at 460.

The method can also include, at 470, dynamically altering the probability criterion. For example, each time a report is not sent, the range over which the random number is generated can be adjusted to increase the probability of meeting the threshold. Likewise, each time a report is sent, the range over which the random number is generated can be reset to an initial range. Alternatively, the random number can be generated based on a distribution that is weighted based on a number of stored reports. As the number of stored reports increases, the probability of exceeding the threshold can increase. When the reports are sent, the stored reports can be removed, thereby reverting or resetting the device to an initial weighting for the random number generation. Although the system has been described in terms of the network management entity providing a threshold and the network element providing a weighting to the distribution of the random number, these roles can be interchanged.

Figure 5:
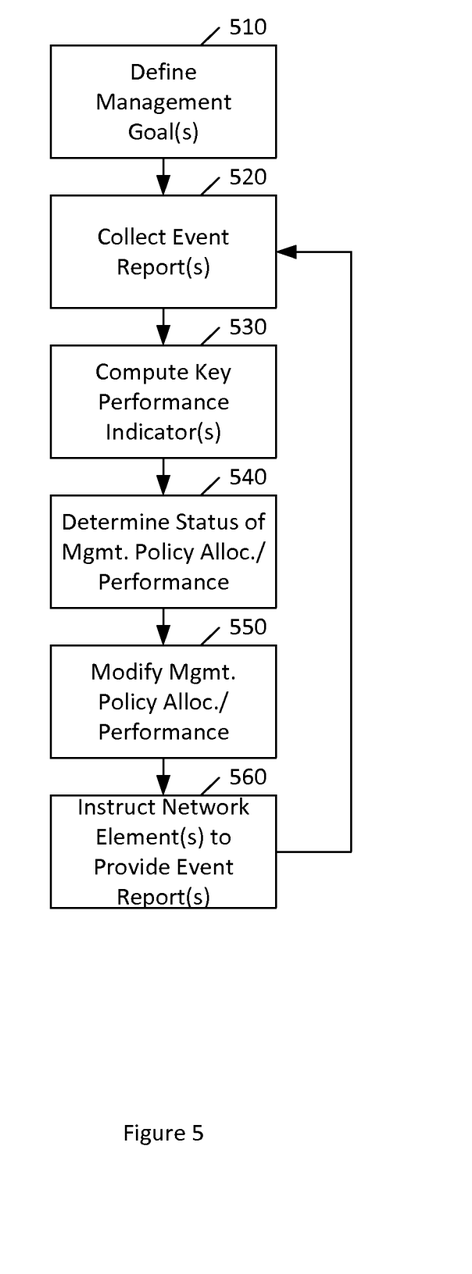
FIG. 5 illustrates a method of a network management entity according to certain embodiments.

FIG. 5 illustrates a method of a network management entity according to certain embodiments. As shown in FIG. 5, a method can include, at 510, defining a management goal of a communication network in terms of a policy with respect to a key performance indicator and a threshold. The method can also include, at 520, collecting an event report. The event report can include report of a fault alarm, a measurement, or the like. The method can further include, at 530, computing the key performance indicator. The method can additionally include, at 540, determining whether at least one of a management policy allocation or a management policy performance satisfies the management goal, based on the key performance indicator and the threshold.

The method can further include, at 550, modifying at least one of the management policy allocation or the management policy performance, when the management goal is not satisfied.

The method can additionally include, at 560, instructing at least one network element to provide event reports. The modifying can include modifying instructions to the least one network element with respect to the event reports.

Figure 6:
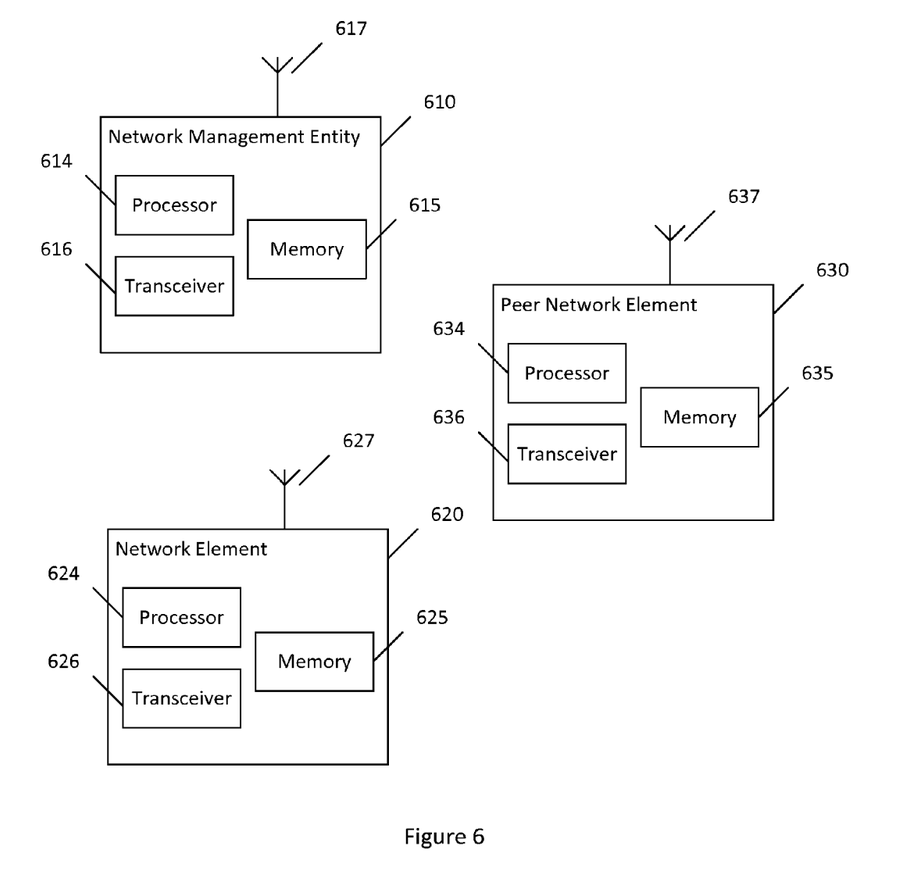
FIG. 6 illustrates a system according to certain embodiments.

FIG. 6 illustrates a system according to certain embodiments of the invention. In one embodiment, a system may include multiple devices, such as, for example, network management entity 610, network element 620, and peer network element 630. Each of these devices may include at least one processor, respectively indicated as 614, 624, and 634. At least one memory is provided in each device, and indicated as 615, 625, and 635, respectively. The memory may include computer program instructions or computer code contained therein. Transceivers 616, 626, and 636 are provided, and each device may also include an antenna, respectively illustrated as 617, 627, and 637. Other configurations of these devices, for example, may be provided. For example, network management entity 610, network element 620, and peer network element 630 may be configured for wired communication, rather than wireless communication, and in such a case antennas 617, 627, and 637 would illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as network management entity 610, network element 620, and peer network element 630, to perform any of the processes described above (see, for example, FIGS. 1-5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a network management entity, network element, and peer network element, embodiments of the invention may be applicable to other configurations, and configurations involving additional elements, as illustrated herein.

A method according to certain embodiments includes detecting a reportable event. The method also includes determining whether or how to report the event based on a probability criterion. The method further includes taking an action with respect to reporting the event based on whether the probability criterion is met.

The detecting the reportable event can include detecting a fault report, detecting that a measurement is available, or detecting that a fault report or measurement has been received from a peer device.

The method can also include selecting the probability criterion from a plurality of probability criteria.

The taking the action can comprise at least one of sending an event report to a management system, sending the event report to a peer, or storing the event report.

The method can further comprise generating a random number.

The determining can include comparing the random number to a predetermined threshold.

The method can additionally include setting the probability criterion.

The setting the probability criterion can be based on instructions received from a management system.

The method can also include dynamically altering the probability criterion.

A method, in certain embodiments, includes defining a management goal of a communication network in terms of a policy with respect to a key performance indicator and a threshold. The method also includes collecting an event report. The method further includes computing the key performance indicator. The method additionally includes determining whether at least one of a management policy allocation or a management policy performance satisfies the management goal, based on the key performance indicator and the threshold.

The method can further include modifying at least one of the management policy allocation or the management policy performance, when the management goal is not satisfied.

The method can additionally include instructing at least one network element to provide event reports.

The modifying can include modifying instructions to the least one network element with respect to the event reports.

An apparatus, according to certain embodiments, includes at least one processor and at least one memory including computer program code. The at least one memory and the computer program code are configured to, with the at least one processor, cause the apparatus at least to detect a reportable event. The at least one memory and the computer program code are also configured to, with the at least one processor, cause the apparatus at least to determine whether or how to report the event based on a probability criterion. The at least one memory and the computer program code are further configured to, with the at least one processor, cause the apparatus at least to take an action with respect to reporting the event based on whether the probability criterion is met.

The at least one memory and the computer program code can be configured to, with the at least one processor, cause the apparatus at least to detect the reportable event, wherein the reportable event includes at least one of detecting a fault report, detecting that a measurement is available, or detecting that a fault report or measurement has been received from a peer device.

The at least one memory and the computer program code can be configured to, with the at least one processor, cause the apparatus at least to select the probability criterion from a plurality of probability criteria.

The at least one memory and the computer program code can be configured to, with the at least one processor, cause the apparatus at least to take the action by at least one of sending an event report to a management system, sending the event report to a peer, or storing the event report.

The at least one memory and the computer program code can be configured to, with the at least one processor, cause the apparatus at least to generate a random number.

The at least one memory and the computer program code can be configured to, with the at least one processor, cause the apparatus at least to compare the random number to a predetermined threshold.

The at least one memory and the computer program code can be configured to, with the at least one processor, cause the apparatus at least to set the probability criterion.

The at least one memory and the computer program code can be configured to, with the at least one processor, cause the apparatus at least to set the probability criterion based on instructions received from a management system.

The at least one memory and the computer program code can be configured to, with the at least one processor, cause the apparatus at least to dynamically alter the probability criterion.

An apparatus, in certain embodiments, includes at least one processor and at least one memory including computer program code. The at least one memory and the computer program code are configured to, with the at least one processor, cause the apparatus at least to define a management goal of a communication network in terms of a policy with respect to a key performance indicator and a threshold. The at least one memory and the computer program code are also configured to, with the at least one processor, cause the apparatus at least to collect an event report. The at least one memory and the computer program code are further configured to, with the at least one processor, cause the apparatus at least to compute the key performance indicator. The at least one memory and the computer program code are additionally configured to, with the at least one processor, cause the apparatus at least to determine whether at least one of a management policy allocation or a management policy performance satisfies the management goal, based on the key performance indicator and the threshold.

The at least one memory and the computer program code can be configured to, with the at least one processor, cause the apparatus at least to modify at least one of the management policy allocation or the management policy performance, when the management goal is not satisfied.

The at least one memory and the computer program code can be configured to, with the at least one processor, cause the apparatus at least to instruct at least one network element to provide event reports.

The at least one memory and the computer program code can be configured to, with the at least one processor, cause the apparatus at least to modify instructions to the least one network element with respect to the event reports.

According to certain embodiments, an apparatus includes detecting means for detecting a reportable event. The apparatus also includes determining means for determining whether or how to report the event based on a probability criterion. The apparatus further includes reporting means for taking an action with respect to reporting the event based on whether the probability criterion is met.

The detecting the reportable event can include detecting a fault report, detecting that a measurement is available, or detecting that a fault report or measurement has been received from a peer device.

The apparatus can also include selecting means for selecting the probability criterion from a plurality of probability criteria.

The taking the action can comprise at least one of sending an event report to a management system, sending the event report to a peer, or storing the event report.

The apparatus can further comprise randomizing means for generating a random number.

The determining can include comparing the random number to a predetermined threshold.

The apparatus can additionally include setting means for setting the probability criterion.

The setting the probability criterion can be based on instructions received from a management system.

The apparatus can also include adaptation means for dynamically altering the probability criterion.

In certain embodiments, an apparatus includes defining means for defining a management goal of a communication network in terms of a policy with respect to a key performance indicator and a threshold. The apparatus also includes collecting means for collecting an event report. The apparatus further includes computing for computing the key performance indicator. The apparatus additionally includes determining means for determining whether at least one of a management policy allocation or a management policy performance satisfies the management goal, based on the key performance indicator and the threshold.

The apparatus can further include modifying means for modifying at least one of the management policy allocation or the management policy performance, when the management goal is not satisfied.

The apparatus can additionally include instructing means for instructing at least one network element to provide event reports.

The modifying can include modifying instructions to the least one network element with respect to the event reports.

A non-transitory computer readable medium is, according to certain embodiments, encoded with instructions that, when executed in hardware, perform a process. The process includes detecting a reportable event. The process also includes determining whether or how to report the event based on a probability criterion. The process further includes taking an action with respect to reporting the event based on whether the probability criterion is met.

The detecting the reportable event can include detecting a fault report, detecting that a measurement is available, or detecting that a fault report or measurement has been received from a peer device.

The process can also include selecting the probability criterion from a plurality of probability criteria.

The taking the action can comprise at least one of sending an event report to a management system, sending the event report to a peer, or storing the event report.

The process can further comprise generating a random number.

The determining can include comparing the random number to a predetermined threshold.

The process can additionally include setting the probability criterion.

The setting the probability criterion can be based on instructions received from a management system.

The process can also include dynamically altering the probability criterion.

A non-transitory computer readable medium is, according to certain embodiments, encoded with instructions that, when executed in hardware, perform a process. The process includes defining a management goal of a communication network in terms of a policy with respect to a key performance indicator and a threshold. The process also includes collecting an event report. The process further includes computing the key performance indicator. The process additionally includes determining whether at least one of a management policy allocation or a management policy performance satisfies the management goal, based on the key performance indicator and the threshold.

The process can further include modifying at least one of the management policy allocation or the management policy performance, when the management goal is not satisfied.

The process can additionally include instructing at least one network element to provide event reports.

The modifying can include modifying instructions to the least one network element with respect to the event reports.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:

detecting a reportable event;

determining whether or how to report the event based on a probability criterion; and taking an action with respect to reporting the event based on whether the probability criterion is met.

2. The method of claim 1, wherein the detecting the reportable event comprises detecting a fault report, detecting that a measurement is available, or detecting that a fault report or measurement has been received from a peer device.

3. The method of claim 1, further comprising:
selecting the probability criterion from a plurality of probability criteria.

4. The method of claim 1, wherein the taking the action comprises at least one of sending an event report to a management system, sending the event report to a peer, or storing the event report.

5. The method of claim 1, further comprising:
generating a random number.

6. The method of claim 5, wherein the determining comprises comparing the random number to a predetermined threshold.

7. The method of claim 1, further comprising:
setting the probability criterion.

8. The method of claim 7, wherein the setting the probability criterion is based on instructions received from a management system.

9. The method of claim 1, further comprising:
dynamically altering the probability criterion.

10. A method, comprising:
defining a management goal of a communication network in terms of a policy with respect to a key performance indicator and a threshold;
collecting an event report;
computing the key performance indicator; and
determining whether at least one of a management policy allocation or a management policy performance satisfies the management goal, based on the key performance indicator and the threshold.

11. The method of claim 10, further comprising:
modifying at least one of the management policy allocation or the management policy performance, when the management goal is not satisfied.

12. The method of claim 10, further comprising:
instructing at least one network element to provide event reports.

13. The method of claim 11, wherein the modifying comprises modifying instructions to the least one network element with respect to the event reports.

14. An apparatus, comprising:
at least one processor; and
at least one memory including computer program code,
wherein the at least one memory and the computer program code are configured to, with the at least one processor, cause the apparatus at least to
detect a reportable event;
determine whether or how to report the event based on a probability criterion; and
take an action with respect to reporting the event based on whether the probability criterion is met.

15. The apparatus of claim 14, wherein the at least one memory and the computer program code are configured to, with the at least one processor, cause the apparatus at least to detect the reportable event, wherein the reportable event includes at least one of detecting a fault report, detecting that a measurement is available, or detecting that a fault report or measurement has been received from a peer device.

16. The apparatus of claim 14, wherein the at least one memory and the computer program code are configured to, with the at least one processor, cause the apparatus at least to select the probability criterion from a plurality of probability criteria.

17. The apparatus of claim 14, wherein the at least one memory and the computer program code are configured to, with the at least one processor, cause the apparatus at least to take the action by at least one of sending an event report to a management system, sending the event report to a peer, or storing the event report.

18. The apparatus of claim 14, wherein the at least one memory and the computer program code are configured to, with the at least one processor, cause the apparatus at least to generate a random number.

19. The apparatus of claim 18, wherein the at least one memory and the computer program code are configured to, with the at least one processor, cause the apparatus at least to compare the random number to a predetermined threshold.

20. The apparatus of claim 14, wherein the at least one memory and the computer program code are configured to, with the at least one processor, cause the apparatus at least to set the probability criterion.

21. The apparatus of claim 20, wherein the at least one memory and the computer program code are configured to, with the at least one processor, cause the apparatus at least to set the probability criterion based on instructions received from a management system.

22. The apparatus of claim 14, wherein the at least one memory and the computer program code are configured to, with the at least one processor, cause the apparatus at least to dynamically alter the probability criterion.

23. An apparatus, comprising:
at least one processor; and
at least one memory including computer program code,
wherein the at least one memory and the computer program code are configured to, with the at least one processor, cause the apparatus at least to
define a management goal of a communication network in terms of a policy with respect to a key performance indicator and a threshold;
collect an event report;
compute the key performance indicator; and
determine whether at least one of a management policy allocation or a management policy performance satisfies the management goal, based on the key performance indicator and the threshold.

24. The apparatus of claim 23, wherein the at least one memory and the computer program code are configured to, with the at least one processor, cause the apparatus at least to modify at least one of the management policy allocation or the management policy performance, when the management goal is not satisfied.

25. The apparatus of claim 23, wherein the at least one memory and the computer program code are configured to, with the at least one processor, cause the apparatus at least to instruct at least one network element to provide event reports.

26. The apparatus of claim 23, wherein the at least one memory and the computer program code are configured to, with the at least one processor, cause the apparatus at least to modify instructions to the least one network element with respect to the event reports.

* * * * *